Patented Jan. 14, 1941

2,228,784

UNITED STATES PATENT OFFICE 2,228,784

LIQUID STARCH AND PROCESS FOR MAKING THE SAME

Simon Spilka, Philadelphia, Pa.

No Drawing. Application March 14, 1939,
Serial No. 261,763

2 Claims. (Cl. 134—19)

The object of the invention is to provide improvements in liquid starch and also in an improved process by which it is prepared.

Another and more specific object is to provide a liquid starch that can be prepared initially in liquid bulk form, and can be kept for indefinite periods without deterioration, discoloration, separation, or other change in or from its original and essentially desirable characteristics, even when subjected to relatively high or low temperatures, and irrespective of whether it is stored in bulk or preserved in bottles, cans or other containers, as so-called shelf goods. In fact, it has been subjected to temperatures as high as the boiling point of water (at sea level), and to temperatures as low as −10° F., without changing its usefulness to the slightest degree, especially as regards such changes as usually result from either or both of these relatively extreme conditions. In fact, even at −10° F., it does not begin to freeze.

A further object is to provide a liquid starch of this character, which can be prepared and marketed in a consistency suitable for stiff laundry work, and which by varying the degree of thinning with water from any available source is made instantly adaptable for semi-stiff laundry work, and also the sizing of yarn, piece goods, manufactured clothing, upholstering materials and the like, the only requirement for preventing the liquid starch from possibly slight deterioration, and an undesirable degree of increased stiffness resulting from evaporation, being that it shall be corked or otherwise maintained air-tight, as for instance after a portion has been used from a given container.

Towards an understanding of the process by which the improved liquid starch product is produced, the preparation of a one-gallon unit will be described. For this purpose, twelve ounces of a suitable dry commercial starch is first mixed thoroughly in one quart of water, and the resulting solution is then placed in three quarts of boiling water, and thereupon boiled together at a temperature of not less than 212° F. and not more than approximately 215° F., for a period of not more than approximately three minutes. As to the type of starch employed, while that prepared from corn, wheat, rice and potatoes can be used with varying results, starch from corn is preferred and particularly that product known as Erkenbrecher, which is marketed by Corn Products Corporation of New York city. Of the temperatures mentioned, the definite minimum is believed to be 212° F., as stated, but the upper limit of the optimum range is not quite so critical, and is, therefore, given as approximately 215° F., the boiling being preferably by means of live steam under pressure, as for instance in a pressure cooker.

After this step has been completed, and the starch has attained a thoroughly liquid condition, the mass is cooled slowly to a temperature of not less than approximately 160° F., at which point approximately one-half ounce of sodium fluoride, previously dissolved in four ounces of water, is added with constant stirring of about three minutes duration. Finally, in order to thereafter prevent separation of the ingredients upon cooling there is added twenty grams of a dispersing compound, consisting of fifteen grams of pine oil and five grams of wintergreen, which latter compound of synthetic oils serves to prevent separation of the resulting product. This last mentioned compound apparently affects the desired functioning of the starch in no way whatever except that it aids in causing the liquid starch to penetrate the fibers of fabric to which it is applied, and also prevents the starch from sticking to the flat iron or equivalent heated element, wherefore said compound primarily represents any one or more of possibly a large group of substances suitable for the same purposes.

So far as the improved liquid starch is concerned, it is now completed and may be allowed to cool, whereupon it may be bottled or otherwise packaged for marketing. However, in order to further improve it from a commercial standpoint, and accordingly provide for its use as a single compound, instead of the two separate preparations comprising the usual freshly made liquid starch and bluing, from five to twenty-five grams of a good grade of bluing is added, either before or after the mass has cooled to atmospheric temperature, the proportion of bluing being dependent upon the quality and density of the same, as said bluing in no way affects the characteristics of the starch per se, as an independent article of commerce and industry.

If after completing the preparation of the liquid starch, either with or without the additional bluing, it is found that it contains any solid particles whatever, these may be removed therefrom by means of simple mechanical straining. Otherwise, the product is ready for storage and use as many times as may be desired. In the matter of ingredients, proportions and temperatures, it is to be understood that these may be varied within such limits as are not precluded by definite specification herein to the contrary.

Having thus described my invention, what I claim as new and desire to protect by Letters Patent of the United States is:

1. A non-separating, non-sticking, fiber-penetrating, liquid starch, comprising a solution having substantially the proportion of 12 ounces of starch, ½ ounce of sodium fluoride, and 15 grams of pine oil in approximately one gallon of water.

2. The process of preparing a non-separating liquid starch, which consists in boiling approximately 12 ounces of starch in approximately one gallon of water at a temperature of between 212° F. and 215° F. for not more than three minutes, cooling the liquid starch to a temperature not lower than approximately 160° F., adding thereto and stirring in for about three minutes approximately ½ ounce of sodium fluoride previously dissolved in about 4 ounces of water, and finally adding approximately 15 grams of pine oil as a penetrating agent.

SIMON SPILKA.